US011750121B2

(12) United States Patent
Stoelting

(10) Patent No.: US 11,750,121 B2
(45) Date of Patent: Sep. 5, 2023

(54) FAULT TOLERANT MULTIPLE ROTARY ACTUATOR ASSEMBLY

(71) Applicant: MOOG INC., East Aurora, NY (US)

(72) Inventor: Paul A. Stoelting, Pendelton, NY (US)

(73) Assignee: Moog Inc., East Aurora, NY (US)

(*) Notice: Subject to any disclaimer, the term of this patent is extended or adjusted under 35 U.S.C. 154(b) by 0 days.

(21) Appl. No.: 17/802,405

(22) PCT Filed: Feb. 26, 2021

(86) PCT No.: PCT/US2021/020022
§ 371 (c)(1),
(2) Date: Aug. 25, 2022

(87) PCT Pub. No.: WO2021/174080
PCT Pub. Date: Sep. 2, 2021

(65) Prior Publication Data
US 2023/0089853 A1 Mar. 23, 2023

Related U.S. Application Data

(60) Provisional application No. 62/983,054, filed on Feb. 28, 2020.

(51) Int. Cl.
H02P 5/747 (2006.01)
B64C 13/50 (2006.01)

(52) U.S. Cl.
CPC .............. H02P 5/747 (2013.01); B64C 13/50 (2013.01)

(58) Field of Classification Search
CPC .................................. H02P 5/747; B64C 13/50
See application file for complete search history.

(56) References Cited

U.S. PATENT DOCUMENTS

| 7,122,926 | B2 | 10/2006 | Tesar |
| 7,190,096 | B2 | 3/2007 | Blanding et al. |
| 7,948,192 | B2 | 5/2011 | Himmelmann |
| 8,136,418 | B2 | 3/2012 | Behar et al. |
| 9,024,491 | B2 | 5/2015 | Wakita |
| 9,086,125 | B2 | 7/2015 | Kopp et al. |
| 9,765,867 | B2 * | 9/2017 | Hirai .................. F16H 25/2021 |

(Continued)

FOREIGN PATENT DOCUMENTS

| CA | 2529534 C | 4/2013 |
| CH | 244922 A | 10/1946 |

(Continued)

Primary Examiner — Kawing Chan
(74) Attorney, Agent, or Firm — Harter Secrest & Emery LLP

(57) ABSTRACT

An actuator assembly comprising an output member rotatable about a center axis relative to a structure, a first actuator having a first stator fixed to the structure and a first rotor rotatable about the center axis relative to the first stator, a second actuator having a second stator coupled to the first rotor such that the second stator rotates about the center axis relative to the first stator with rotation of the first rotor about the center axis and having a second rotor rotationally coupled to the output member, a controller configured in a failure mode to drive one of the first actuator or the second actuator to selectively control the rotation of the output member about the center axis with an operational failure of the other of the first actuator or the second actuator.

28 Claims, 12 Drawing Sheets

(56) References Cited

U.S. PATENT DOCUMENTS

| | | |
|---|---|---|
| 10,066,715 B2 | 9/2018 | Larson et al. |
| 10,753,444 B2 * | 8/2020 | Kopp ...................... B64C 27/72 |
| 2003/0155832 A1 * | 8/2003 | Herren ................. H02K 16/025 |
| | | 310/112 |
| 2007/0068291 A1 | 3/2007 | Beatty et al. |
| 2009/0289145 A1 | 11/2009 | Behar et al. |
| 2015/0081102 A1 | 3/2015 | Kopp et al. |
| 2016/0312867 A1 * | 10/2016 | Larson .................. F16H 25/205 |
| 2017/0217600 A1 * | 8/2017 | Regev .................... B64D 35/02 |
| 2017/0274992 A1 * | 9/2017 | Chretien ................ B64D 35/02 |
| 2022/0340292 A1 * | 10/2022 | Churchill ............... B64D 27/24 |

FOREIGN PATENT DOCUMENTS

| | | |
|---|---|---|
| CN | 107612205 B | 12/2019 |
| EP | 1793477 A1 | 6/2007 |
| FR | 2295612 A1 | 7/1976 |
| KR | 101712126 B1 | 3/2017 |

* cited by examiner

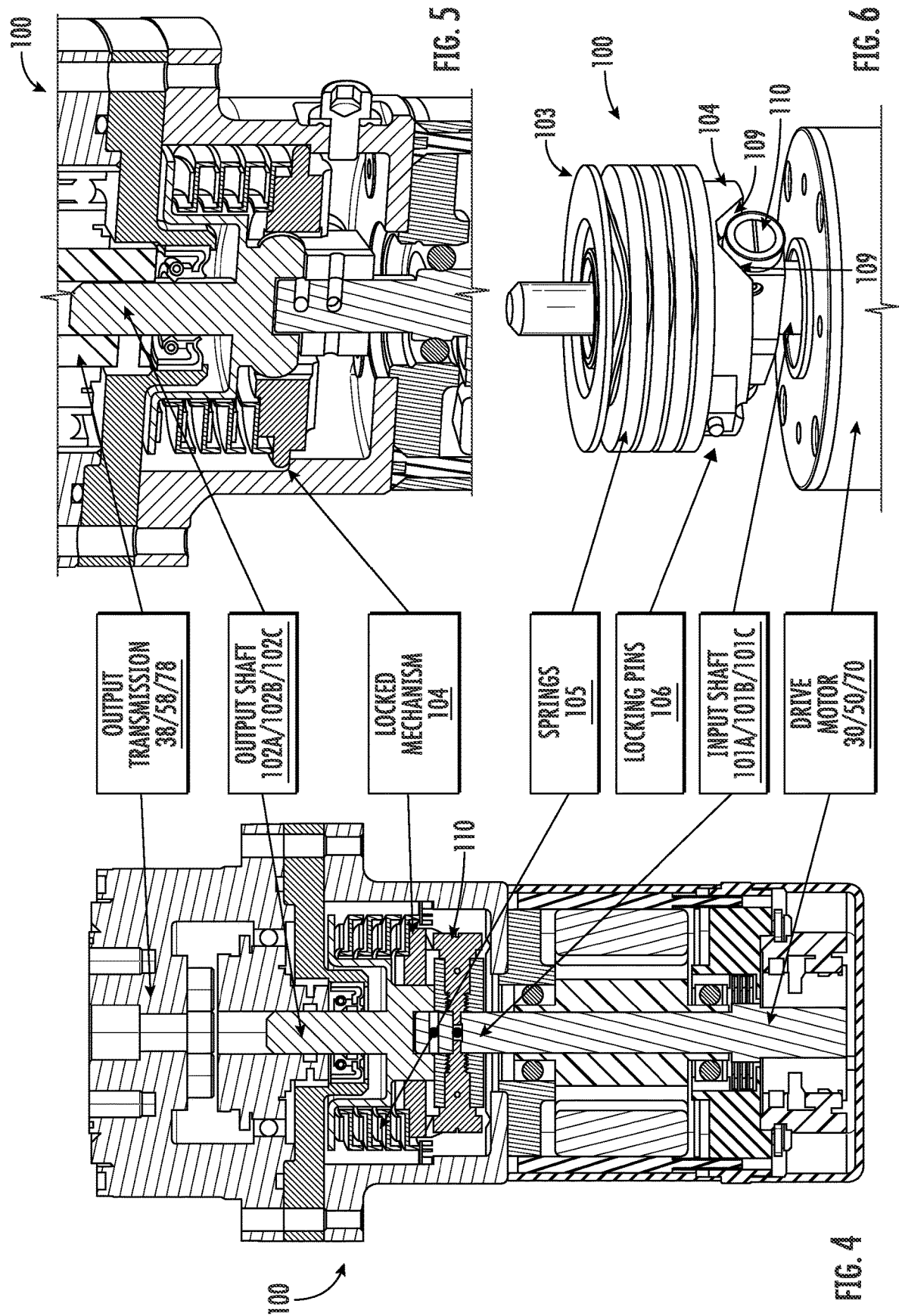

FAULT TOLERANT MULTIPLE ROTARY ACTUATOR ASSEMBLY

TECHNICAL FIELD

The present invention relates generally to the field of redundant flight control actuator systems, and more specifically to an electromechanical redundant actuator system.

BACKGROUND ART

Redundant actuator systems are generally known. U.S. Pat. No. 8,136,418, issued Mar. 20, 2012 and entitled "Electromechanical Actuating Assembly," is directed to an assembly operable in a plurality of fault-tolerant modes.

U.S. Pat. No. 8,136,418, issued Mar. 20, 2012 and entitled "Electromechanical Actuating Assembly," is directed to an assembly operable in a plurality of fault-tolerant modes.

U.S. Pat. No. 7,122,926, issued Oct. 17, 2016 and entitled "Fault-Tolerant Rotary Actuator," is directed to an actuator module containing two actuator subsystems.

U.S. Patent Application Publication No. US 2007/0068291, published Mar. 29, 2007 and entitled "Failure-Tolerant Redundant Actuator System," is directed to an actuator system that is tolerant to any single point failure.

U.S. Patent Application Publication No. US 2015/0081102, published Mar. 19, 2015 and entitled "Actuator System and Method," is directed to an actuator system having multiple actuators and linkages, including a shared link, to rotate a controlled element.

U.S. Pat. No. 9,086,125, issued Jul. 21, 2015 and entitled "Rotary Actuator," is directed to an actuator system having multiple actuators and multiple linkages with independent degrees of freedom.

SUMMARY

With parenthetical reference to the corresponding parts, portions or surfaces of the disclosed embodiment, merely for the purposes of illustration and not by way of limitation, the present disclosure provides a rotary actuator assembly (15) comprising: an output member (16) configured to selectively rotate about a rotary output axis (18) relative to a structure (19) and configured to impart motion to a driven object (20); a first sub-actuator (30) having a first stator (31) and a first rotor (32); the first stator (31) fixed to the structure (19) and the first rotor (32) configured to selectively rotate about a first sub-axis of rotation (33) relative to the first stator (31); a second sub-actuator (50) having a second stator (51) and a second rotor (52); the second rotor (52) configured to selectively rotate about a second sub-axis of rotation (53) relative to the second stator (51); the second stator (51) rotationally coupled to the first rotor (32) such that the second stator (51) rotates about the first sub-axis of rotation (33) relative to the first stator (31) with rotation of the first rotor (32) about the first sub-axis of rotation (33) relative to the first stator (31); the second rotor (53) rotationally coupled to the output member; at least one controller (90, 91A, 91B) configured to drive the first sub-actuator and the second sub-actuator to selectively control rotation of the output member about the rotary output axis within an output angular range of rotary motion about the rotary output axis; the controller configured in a normal mode to drive the first sub-actuator and the second sub-actuator to selectively control the rotation of the output member about the rotary output axis within the output angular range of rotary motion as a function of a sum of rotation of the first rotor and the second rotor about the first sub-axis of rotation and the second sub-axis of rotation, respectively, relative to the structure; and the controller configured in a failure mode to drive one of the first sub-actuator or the second sub-actuator to selectively control the rotation of the output member about the rotary output axis within the output angular range of rotary motion with an operational failure of the other of the first sub-actuator or the second sub-actuator.

The rotary actuator assembly may comprise a third sub-actuator (70) having a third stator (71) and a third rotor (72); the third rotor (72) configured to selectively rotate about a third sub-axis of rotation (73) relative to the third stator (71); the third stator (71) rotationally coupled to the second rotor (52) such that the third stator (71) rotates about the second sub-axis of rotation (53) relative to the second stator (51) with rotation of the second rotor (52) about the second sub-axis of rotation (53) relative to the second stator (51); the third rotor (72) rotationally coupled to the output member (16) between the second rotor (52) and the output member (16); the controller (90, 91A, 91B, 91C) configured in the normal mode to drive the first sub-actuator, the second sub-actuator, and the third sub-actuator to selectively control the rotation of the output member about the rotary output axis within the output angular range of rotary motion as a function of a sum of rotation of the first rotor, the second rotor, and the third rotor about the first sub-axis of rotation, the second sub-axis of rotation, and the third sub-axis of rotation, respectively, relative to the structure; and the controller configured in the failure mode to drive at least one of the first sub-actuator, the second sub-actuator, or the third sub-actuator to selectively control the rotation of the output member about the rotary output axis within the output angular range of rotary motion with an operational failure of the other of the first sub-actuator, the second sub-actuator, or the third sub-actuator.

The first sub-axis of rotation (33) and the second sub-axis of rotation (52) may be the same and the first rotor (32) and the second rotor (52) may be coaxial. The first sub-axis of rotation (33), the second sub-axis of rotation (53), and the third sub-axis of rotation (73) may be the same and the first rotor (32), the second rotor (52), and the third rotor (72) may be coaxial. The first sub-axis of rotation (33), the second sub-axis of rotation (53), and the rotary output axis (18) may be the same.

The first sub-actuator may comprise a first sub-actuator housing (34) containing the first stator (31) and fixed relative to the structure, and the second sub-actuator may comprise a second sub-actuator housing (54) containing the second stator (51) and configured to rotate about the first sub-axis of rotation (33) relative to the first sub-actuator housing with rotation of the first rotor (32) about the first sub-axis of rotation (33) relative to the first sub-actuator housing. The third sub-actuator may comprise a third sub-actuator housing (74) containing the third stator (71) and configured to rotate about the second sub-axis of rotation (53) relative to the second sub-actuator housing with rotation of the second rotor (52) about the second sub-axis of rotation (53) relative to the second sub-actuator housing.

The first sub-actuator may comprise a no-back brake (100, 100A) configured to selectively restrain the first rotor from rotating about the first sub-axis of rotation relative to the first stator in a back-driven rotational direction with an operational failure of the first sub-actuator; and the second sub-actuator may comprises a no-back brake (100, 100B) configured to selectively restrain the second rotor from rotating about the second sub-axis of rotation relative to the second stator in a back-driven rotational direction with an operational failure of the second sub-actuator. The controller may be configured to sense an operational failure of the first sub-actuator and to cease driving the first sub-actuator in response, and the controller may be configured to sense an operational failure of the second sub-actuator and to cease driving the second sub-actuator in response.

The first sub-actuator may comprise a first position sensor (35) connected to the controller and configured to sense an angular position of the first rotor about the first sub-axis of rotation relative to the first stator, and the second sub-actuator may comprise a second position sensor (55) connected to the controller and configured to sense an angular position of the second rotor about the second sub-axis of rotation relative to the second stator. The output member may comprise an output position sensor (22) connected to the controller and configured to sense an angular position of the output member about the rotary output axis relative to the structure.

The rotary actuator system may comprise a first gearing (38) between the first rotor and the second stator, and a second gearing (58) between the second rotor and the output member. The first gearing and the second gearing may each comprise an input to output ratio of greater than one. The first gearing and the second gearing may each comprise a planetary gear. The rotary actuator system may comprise gearing (38) between the first rotor and the second stator and the first rotor may comprise an input to the gearing and the second stator may comprise an output from the gearing. The second stator (51) may rotate about the first sub-axis of rotation (33) relative to the first stator (31) with rotation of the first rotor (32) about the first sub-axis of rotation (33) relative to the first stator (31) at a rate of rotation that differs from a rate of rotation of the first rotor (32) about the first sub-axis of rotation (33) relative to the first stator (31). The rate of rotation of the second stator about the first sub-axis of rotation relative to the first stator may differ from the rate of rotation of the first rotor about the first sub-axis of rotation relative to the first stator as a function of a coupling ratio between the second stator and the first rotor.

The output angular range of rotary motion (21) may be less than 360 degrees about the rotary output axis. The rotary actuator system may comprise a first mechanical stop (60) limiting rotation of the second stator about the first sub-axis of rotation relative to the first stator to a second stator angular limit of less than or equal to 360 degrees. The second stator angular limit of the first mechanical stop may be at least twice the output angular range of rotary motion (21) of the output member about the rotary output axis. The rotary actuator system may comprise a mechanical stop (23) limiting the output member to the output angular range of rotary motion of the output member about the rotary output axis. The rotary actuator system may comprise a first mechanical stop (60) limiting rotation of the second stator about the first sub-axis of rotation relative to the first stator to a second stator angular limit of less than 360 degrees and a second mechanical stop (80) limiting rotation of the third stator about the second sub-axis of rotation relative to the first stator to a third stator angular limit of less than 360 degrees. The second stator angular limit of the first mechanical stop (60) may be at least twice the output angular range of rotary motion (21) of the output member about the rotary output axis and the third stator angular limit of the second mechanical stop (80) may be at least twice the second stator angular limit of the first mechanical stop, and the rotary actuator system may comprise a mechanical stop (23) limiting the output member to the output angular range of rotary motion of the output member about the rotary output axis.

The first sub-actuator may comprise a brushless DC permanent magnet motor configured to drive the first rotor about the first sub-axis of rotation relative to the first stator and the second sub-actuator may comprise a brushless DC permanent magnet motor configured to drive the second rotor about the second sub-axis of rotation relative to the second stator.

The driven object may be selected from a group consisting of an aircraft flight control mechanism and an aircraft flight control surface. The driven object may comprise an aircraft flight control surface and the aircraft flight control surface may be selected from a group consisting of an elevator, a rudder, an aileron, a flap, a slat, a stabilizer, and a spoiler. The driven object may comprise an aircraft flight control surface and the output member may be connected to the flight control surface via a torque tube. The driven object may comprise an aircraft flight control mechanism and the aircraft flight control mechanism may be selected from a group consisting of a helicopter main rotor blade, a helicopter tail rotor blade, a helicopter main rotor swashplate, and a helicopter tail rotor swashplate.

The operational failure may comprise a mechanical jam, an electrical motor failure or a loss of power.

BRIEF DESCRIPTION OF THE DRAWINGS

FIG. 4 is a cross-sectional view of a no-back device shown in FIG. 3.

FIG. 5 is an enlarged cross-sectional and perspective view of the no-back device shown in FIG. 4.

FIG. 6 is a partial perspective view of the no-back device shown in FIG. 5.

FIG. 13 longitudinal cross-sectional view of the three-motor embodiment of an improved actuator system shown in FIG. 12.

DETAILED DESCRIPTION OF THE EMBODIMENTS

Figure 1:
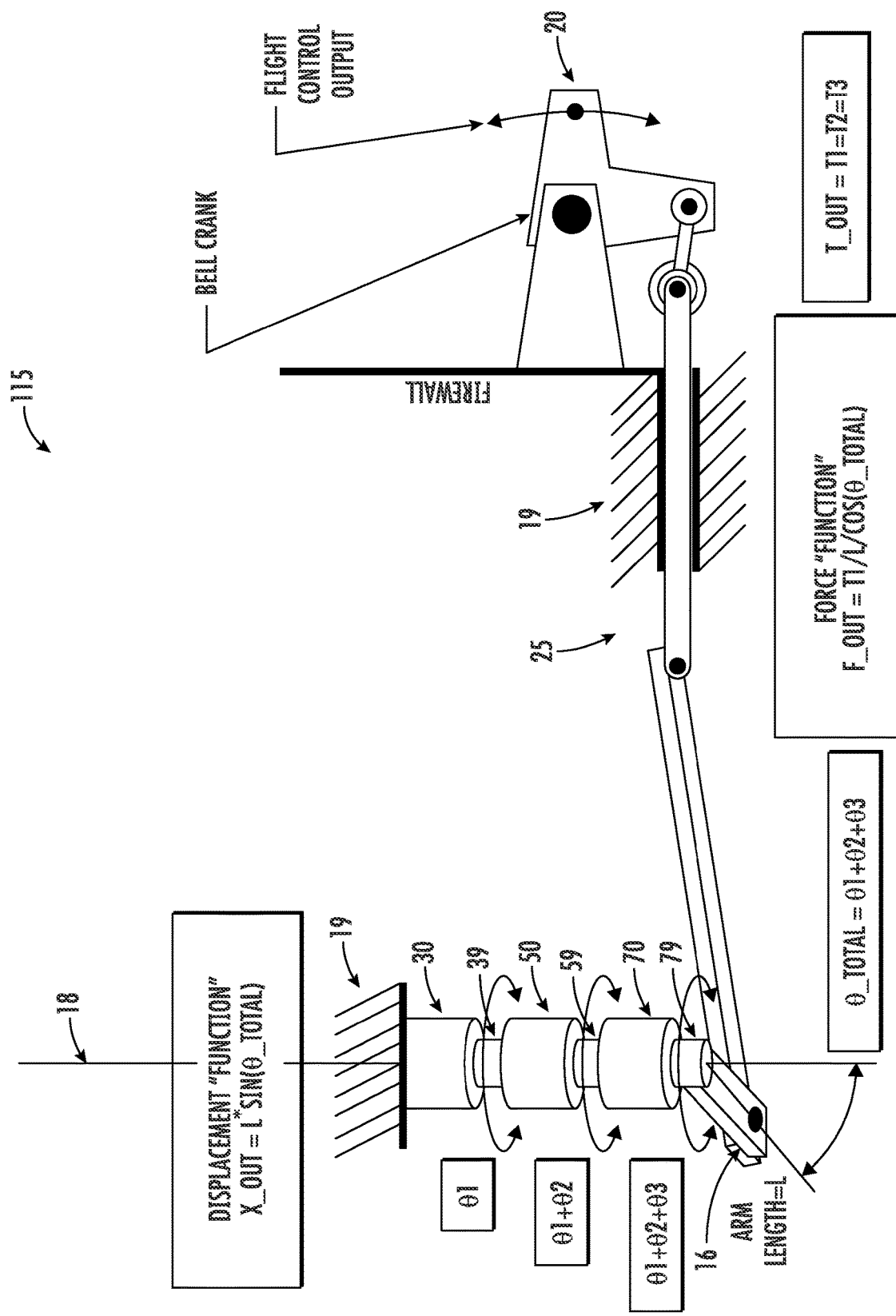
FIG. 1 is schematic view of a three-motor embodiment of an improved actuator system connected to a flight control output.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
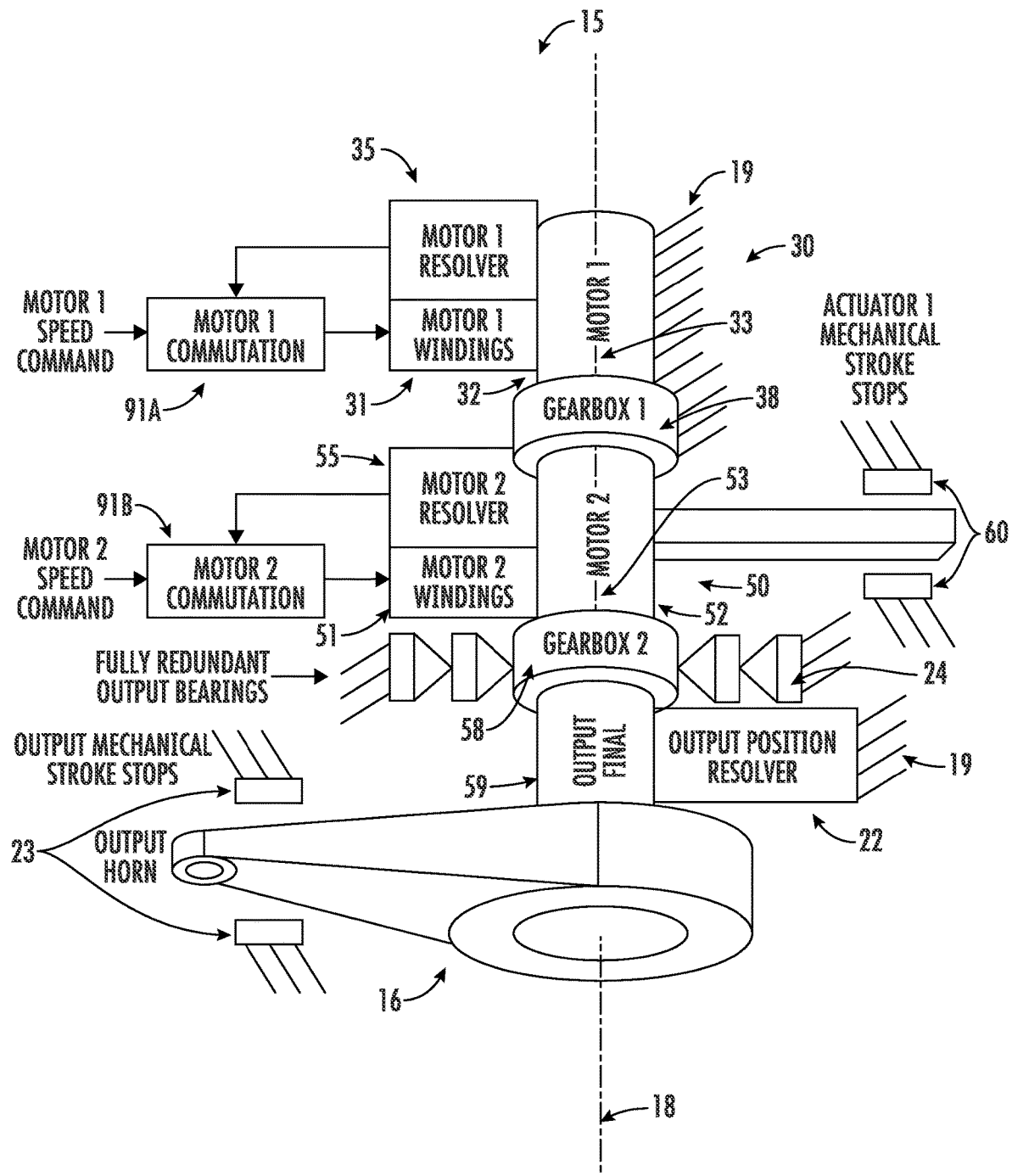
FIG. 2 is schematic view of a two-motor embodiment of an improved actuator system.
Figure 3:
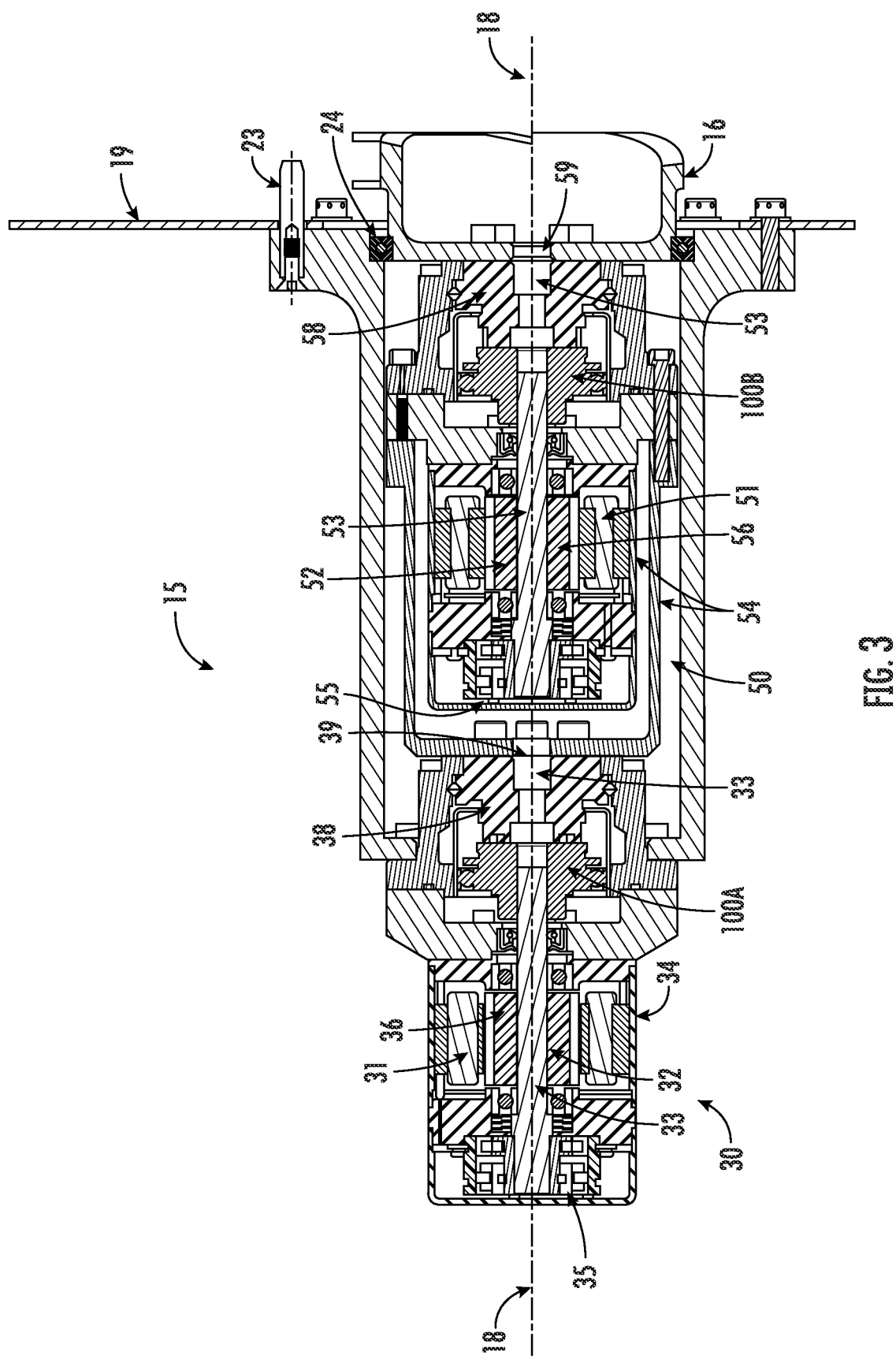
FIG. 3 longitudinal cross-sectional view of the two-motor embodiment of an improved actuator system shown in FIG. 2.
Figure 12:
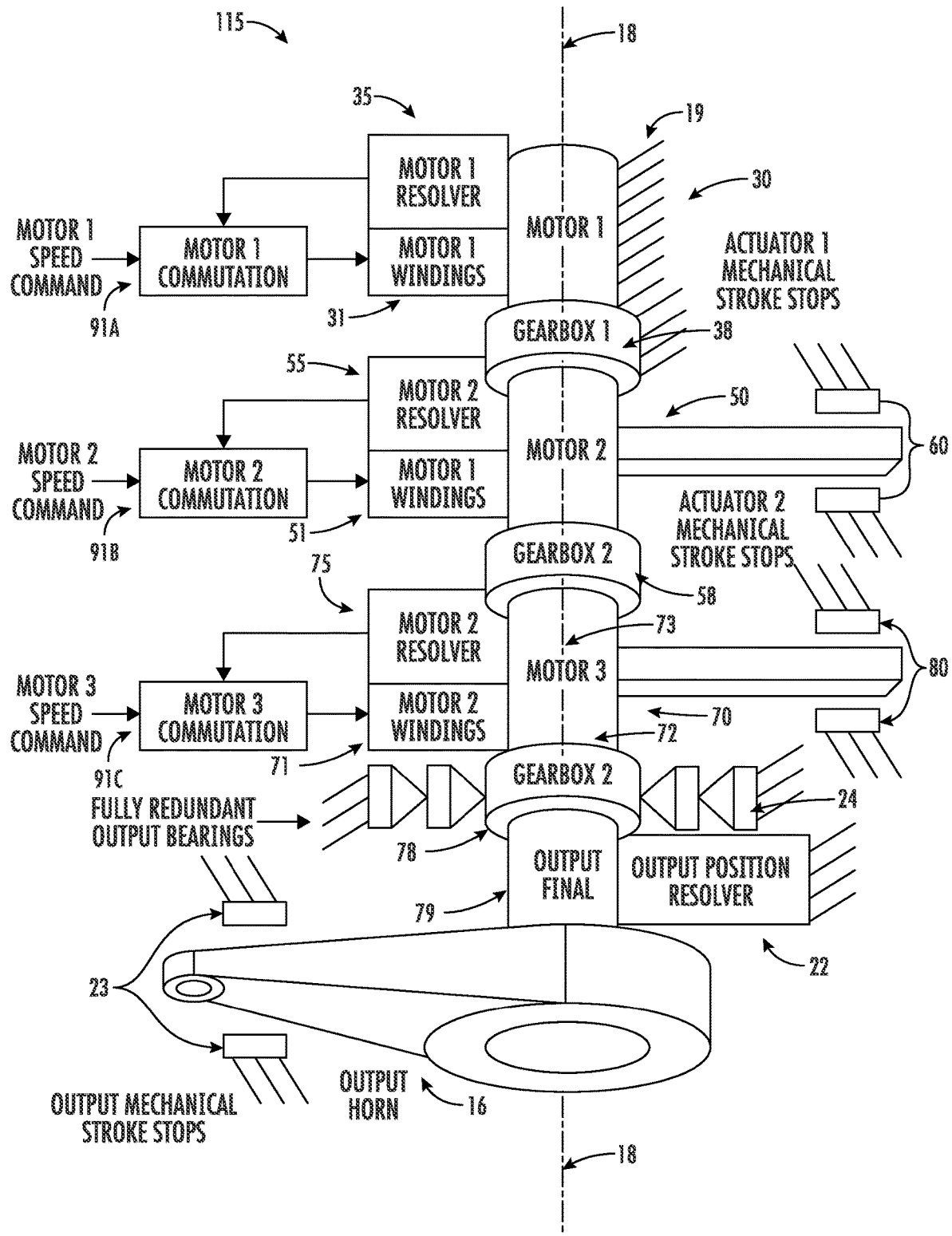
FIG. 12 is schematic view of the three-motor embodiment of an improved actuator system shown in FIG. 1.
Figure 3:
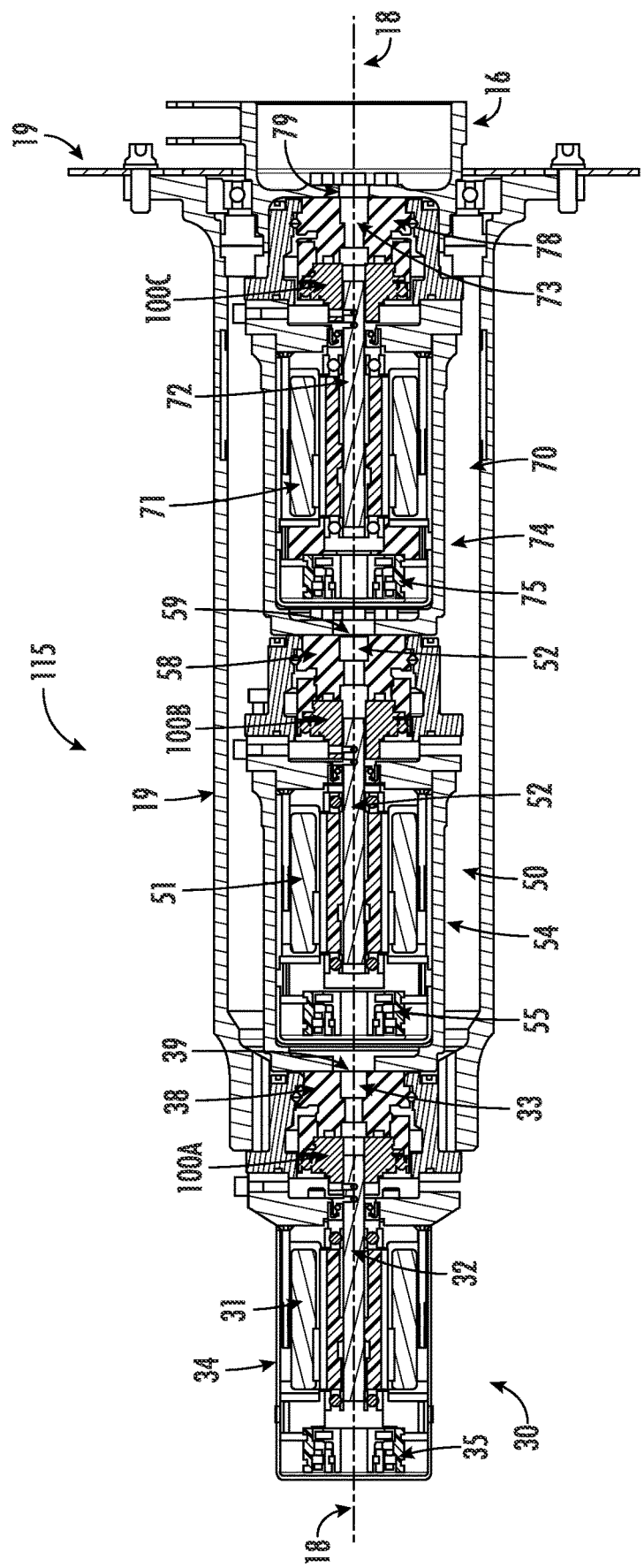

Referring now to the drawings, and more particularly to FIGS. 1, 2 and 12 thereof, an improved actuator system is provided, a first two-motor embodiment of which is generally indicated at 15 and a second three-motor embodiment of which is generally indicated at 115. As shown in FIGS. 2 and 3, two-motor system 15 generally includes actuator 30, actuator 50 rotationally coupled to actuator 30 via no-back device 100A and gear transmission 38, and output horn 16 rotationally coupled to actuator 50 via no-back device 100B and gearbox 78.

Actuator 30 is supported in housing 34 and includes stator 31 and rotor 32. Housing 34 and stator 31 are fixed to aircraft frame 19 of an aircraft and rotor 32 is driven to rotate about central axis 18 relative to housing 34 and stator 31. In this embodiment actuator 30 is a brushless DC permanent magnet electrical motor with non-powered no-back device 100A and planetary gearing unit 38. Rotary motor 30 includes outer non-rotating stator 31 with coil windings and inner rotor 32 with permanent magnets 36. Stator 31 is fixed to motor housing 34 such that stator 31 does not rotate relative to housing 34. When current is appropriately applied through the coils of stator 31, via leads 42 and drive unit 91A, a magnetic field is induced. The magnetic field interaction between stator 31 and rotor 32 generates torque which may rotate shaft 101A. Drive electronics 91A, based on resolver 35 angular position feedback, generate and commutate the stator fields to vary the speed and direction of motor 30. Accordingly, motor 30 will selectively apply a torque on rotor 32 in either direction about axis 18 at varying speeds. Rotor 32 is thereby driven to selectively rotate about axis of rotation 33 relative to stator 31 and housing 34.

Figure 7:
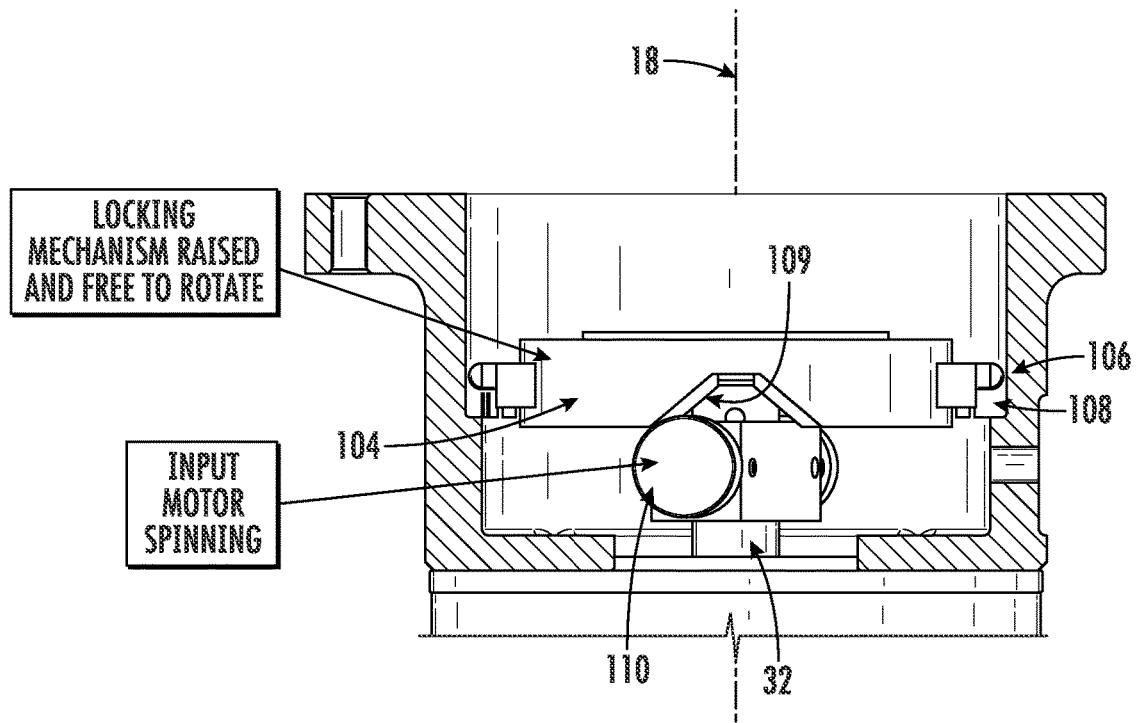
FIG. 7 is a partial cross-sectional view of the no-back device shown in FIG. 6 in an unlocked position.
Figure 8:
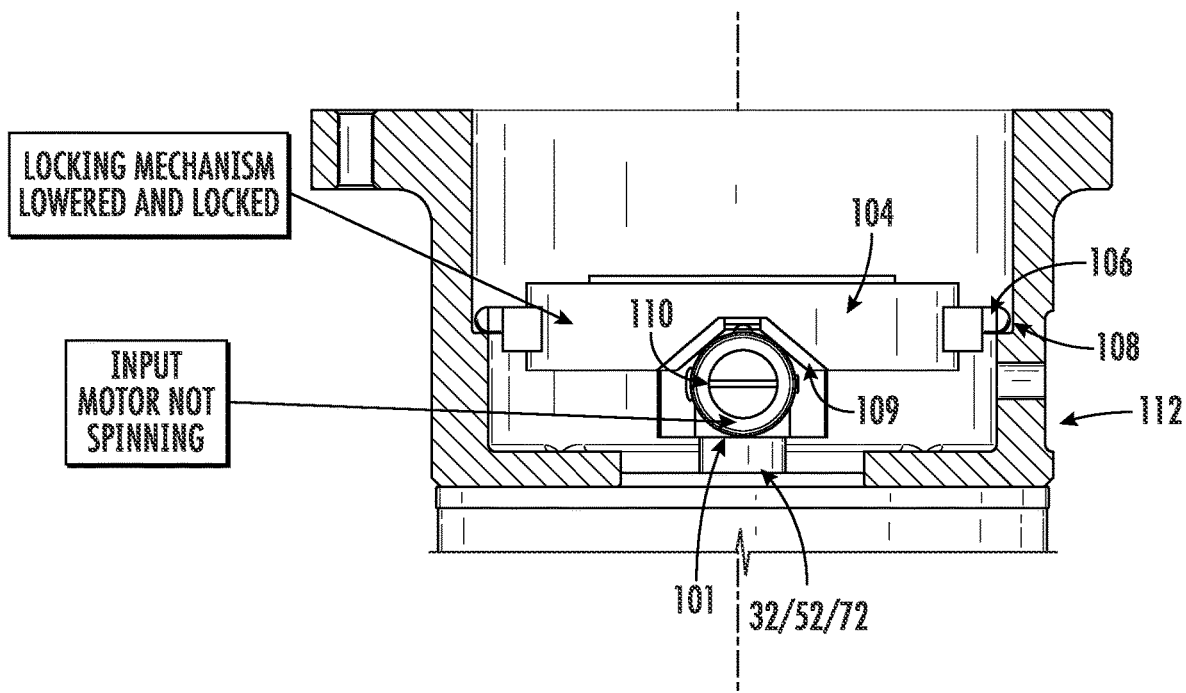
FIG. 8 is a partial cross-sectional view of the no-back device shown in FIG. 6 in a locked position.

Rotor 32 is rotationally coupled to no-back input shaft 101A of no-back device 100A. As shown in FIGS. 4-6, no-back device 100A includes springs 105 acting between upper bearing plate 103 and lower locking plate 104, dual inclined ramp notches 109 and input shaft cams 110, and lock pins 106 in plate 104 and lock slots 108 in housing 112. As shown in FIG. 8, when no torque is applied from input shaft 101 on shaft cams 110, locking plate 104 is biased by springs 105 in a lowered position with locking pins 106 seated in respective housing slots 108 such that output shaft 102A is not permitted to rotate about center axis 18 relative to housing 112. This is a locked position. As shown in FIG. 7, when torque is applied and shaft 32 rotates in either direction about axis 18, such rotation forces shaft cams 110 to bear against one of the ramped surfaces (depending on the direction of rotation) of respective inclined notches 109 and ride out of respective notches 109, which in turn forces locking plate 104 upwards, compresses springs 105, and moves pins 106 out of respective locking slots 108 in housing 112. This allows rotation of output shaft 102A about center axis 18 relative to housing 112 and compresses springs 105 such that output shaft 102A rotates with rotation of input shaft 101A. This is an unlocked position. Thus, output shaft 102A is prevented from rotating in the absence of a driving torque from motor 30 and rotor 32 on input shaft 101A by springs 105 that effectively ground output shaft 102A to fixed structure 112 via plate 104 and lock pins 106. Upon the application of torque from rotor 32 to input shaft 101A, springs 105 are compressed and pins 106 are released from fixed structure 112 and output shaft 102A is engaged to provide for the transmission of power from input shaft 101A to output shaft 102A.

Output shaft 102A of no-back device 100A is in turn rotationally coupled to gear transmission 38. In this embodiment, gear transmission 38 includes an input gear shaft rotationally coupled to output shaft 102A of no-back device 100A, an output gear shaft 39 connected to housing 54, and a planetary gear train between the input gear shaft and output gear shaft 39. In this embodiment, the input to output ratio of gear box 38 is greater than 1 and is preferably 120 to 1.

Other rotary motors or actuators, such as stepper motors, brush motors, induction motors, rotary hydraulic actuators, or the like, may be used as alternatives. Also, other no-back devices, including without limitation powered no-back devices, may be used as alternatives. In addition, other gear transmissions or rotational couplings, such as a belt coupling or other similar couplings, may be used to provide a desired gear or speed ratio, or no gears may be used as alternatives.

Output gear shaft 39 of gearing 38 is in turn rigidly connected to housing 54 of motor 50. Housing 54 is rotationally supported by aircraft frame 19 such that housing 54 will rotate about axis 18 with the rotation of output shaft 39 of gearing 38, which is rotationally coupled to rotor 32 of motor 30. If rotor 32 of motor 30 is not rotating relative to frame 19 and/or no-back device 100A is in a locked position, housing 54 does not rotate relative to frame 19 and motor housing 34. If no-back device 100A is in an unlocked position, housing 54 will rotate about axis 18 relative to aircraft frame 19 and motor housing 34 with rotation of rotor 32 relative to aircraft frame 19 and motor housing 34 as a function of the coupling ratio between rotor 32 and output gear shaft 39 of gearing 38.

Actuator 50 is supported in housing 54 and includes stator 51 and rotor 52. Stator 51 is fixed to housing 54 and rotor 52 is driven to rotate about central axis 18 relative to housing 54 and stator 51. In this embodiment actuator 50 is a brushless DC permanent magnet electrical motor with non-powered no-back device 100B and planetary gearing unit 58. Rotary motor 50 includes outer non-rotating stator 51 with coil windings and inner rotor 52 with permanent magnets 56. Stator 51 is fixed to motor housing 54 such that stator 51 does not rotate relative to housing 54. When current is appropriately applied through the coils of stator 51, via leads 62 and drive unit 91B, a magnetic field is induced. The magnetic field interaction between stator 51 and rotor 52 generates torque which may rotate shaft 101B. Drive electronics 91B, based on resolver 55 angular position feedback, generate and commutate the stator fields to vary the speed and direction of motor 50. Accordingly, motor 50 will selectively apply a torque on rotor 52 in either direction about axis 18 at varying speeds. Rotor 52 is thereby driven to selectively rotate about axis of rotation 53 relative to stator 51 and housing 54.

Rotor 52 is rotationally coupled to no-back input shaft 101B of no-back device 100B. No-back device 100B is substantially the same configuration as no-back device 100A. Thus, output shaft 102B is prevented from rotating in the absence of a driving torque from motor 50 and rotor 52 on input shaft 101B by springs 105 that effectively ground output shaft 102B to housing 54 via plate 104 and lock pins 106. Upon the application of torque from rotor 52 to input shaft 101B, springs 105 are compressed and pins 106 are released from housing 54 and output shaft 102B is engaged to provide for the transmission of power from input shaft 101B to output shaft 102B.

Output shaft 102B of no-back device 100B is in turn rotationally coupled to gear transmission 58. Gear transmission 58 is substantially the same configuration as gear transmission 38. In this embodiment, the input to output ratio of gear box 58 is greater than 1 and is preferably 120 to 1.

Other rotary motors or actuators, such as stepper motors, brush motors, induction motors, rotary hydraulic actuators, or the like, may be used as alternatives. Also, other no-back devices, including without limitation powered no-back devices, may be used as alternatives. In addition, other gear transmissions or rotational couplings, such as a belt coupling or other similar couplings, may be used to provide a desired gear or speed ratio, or no gears may be used as alternatives.

Output gear shaft 59 of gearing 58 is in turn rigidly connected to output horn 16. Output horn 16 is rotationally supported by aircraft frame 19 such that output horn 16 will rotate about axis 18 with the rotation of output shaft 59 of gearing 58, which is rotationally coupled to rotor 52 of motor 50. If rotor 52 of motor 50 is not rotating relative to motor housing 54 and/or no-back device 100B is in a locked position, output horn 16 does not rotate relative to housing 54. If no-back device 100B is in an unlocked position, output horn 16 will rotate about axis 18 relative to housing 54 with rotation of rotor 52 relative to motor housing 54 as a function of the coupling ratio between rotor 52 and output gear shaft 59 of gearing 58.

Figure 10:
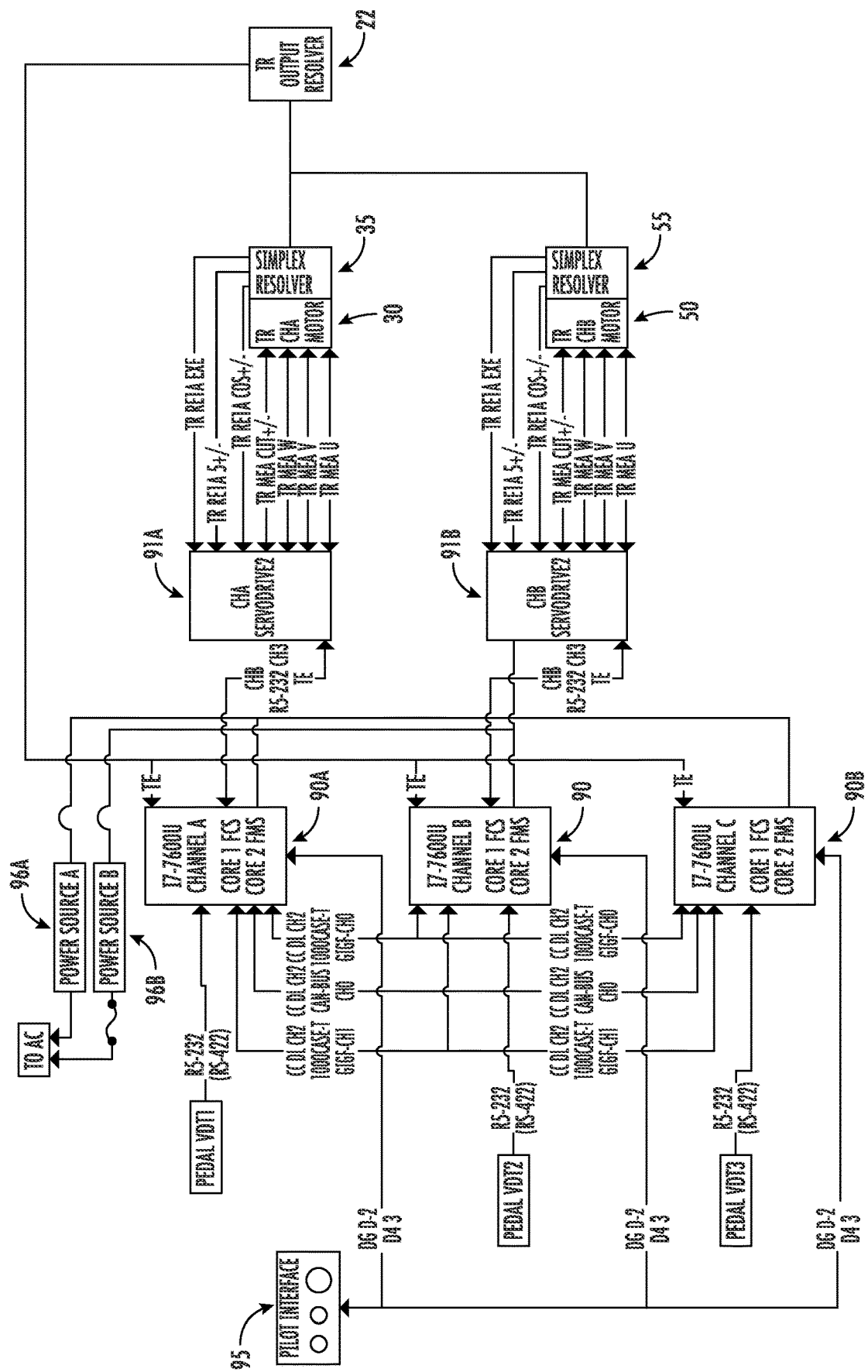
FIG. 10 is a block diagram of the controller system of the two-motor embodiment of an improved actuator system shown in FIG. 3.
Figure 11:
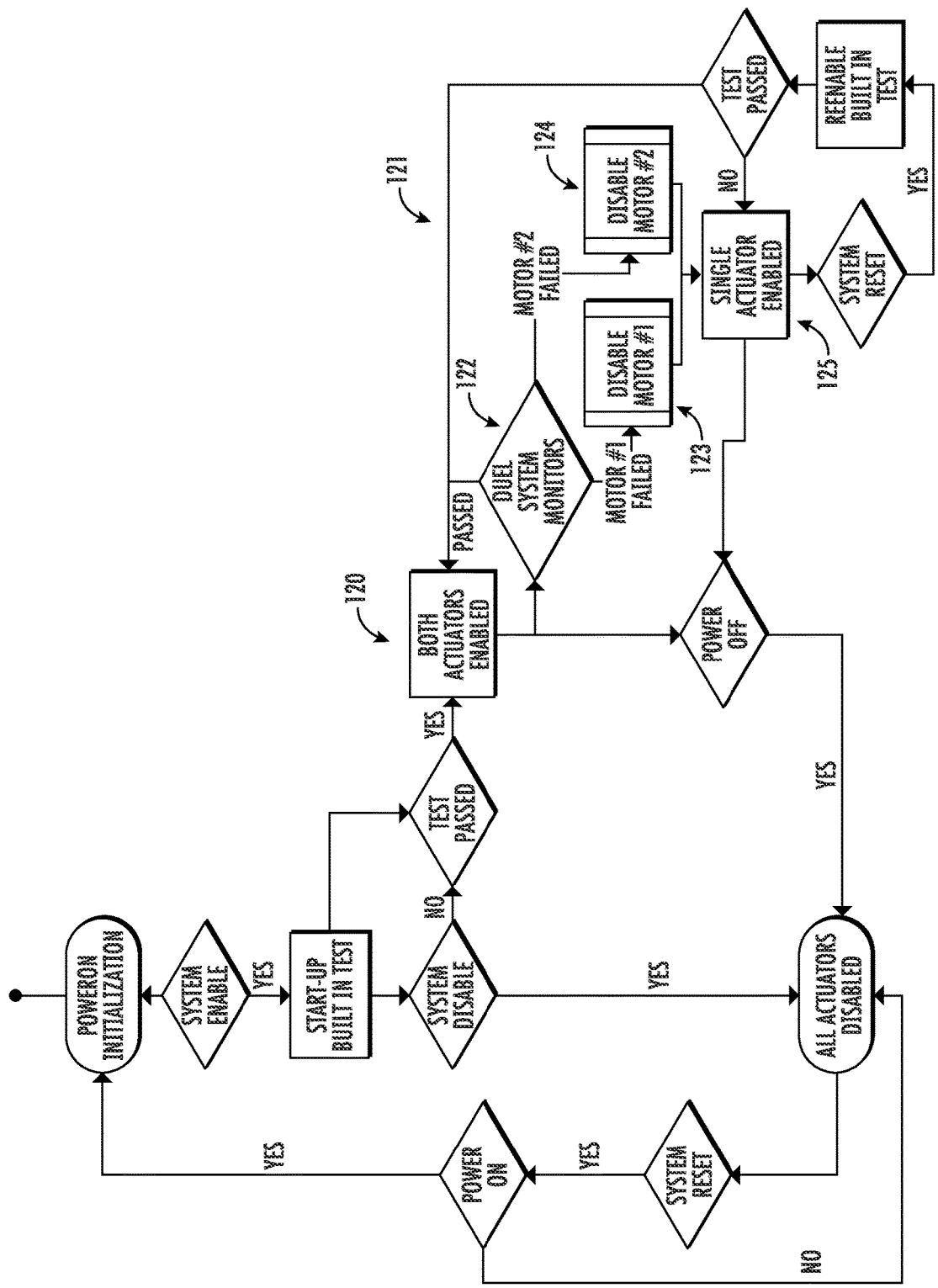
FIG. 11 is a block diagram of controller logic for the controller system shown in FIG. 10.

As shown in FIGS. 10 and 11, controller 90 is connected to motor drivers 91A and 91B and monitors 122 actuators 30 and 50 and provides commands to actuators 30 and 50 to move output horn 16 to a desired position by controlling the respective rotation of rotor 32 relative stator 31 and motor housing 34 and the rotation of rotor 52 relative to stator 51 and motor housing 54. In a normal mode 120, actuators 30 and 50 are controlled to rotate output horn 16 and, via linkage 25, move flight control output 20 as a function of the sum of the rotation of rotor 32 and rotor 52 relative to frame 19. However, in motor failure mode 121, either actuator 30 may be controlled to rotate output horn 16 and flight control output 20 as a function of the rotation of rotor 32 relative to frame 19 when actuator 50 fails, or actuator 50 may be controlled to rotate output horn 16 and flight control output 20 as a function of the rotation of rotor 52 relative to frame 19 when actuator 30 fails. Accordingly, actuators 30 and 50 have the characteristic that they are not back-drivable following a failure of the subject actuator and the system allows for full flight control performance in the event of an actuator failure.

During normal operation 120, both actuators 30 and 50 are used to rotate output horn 16 and flight control output 20 relative to frame 19. This may be referred to as an active-active scheme and is the preferred operational scheme in normal operation 120. However, if actuator 50 fails and is no longer powered or is disabled 124, because of no-back mechanism 100B, output horn 16 may be rotated by actuator 30 alone 125, with output shaft 102B restrained from rotation relative to stator 51 and housing 54 via no-back mechanism 100B and motor 50 thereby operating as a rigid coupling. Alternatively, if actuator 30 fails and is no longer powered or is disabled 123, because of no-back mechanism 100A, output horn 16 may be rotated by actuator 50 alone 125, with output shaft 102A restrained from rotation relative to stator 31 and housing 34 via no-back mechanism 100A and motor 30 thereby operating as a rigid coupling.

In the active-active scheme and normal mode 120, controller 90 normally divides the position command equally among actuators 30 and 50 to provide control. Following the failure of an actuator, the command to the remaining actuator is simply the position command. Should any actuator stop at a non-centered position, the command to the remaining actuator is biased to washout or cancel the non-centered input of the failed actuator.

Alternatively, in normal mode 120, just one of actuators 30 and 50 may be used to rotate output horn 16 and flight control output 20 relative to frame 19 during normal operation and this is referred to as an active-standby scheme. In this active-standby scheme, a single actuator provides full performance control until it fails and is disabled. When this occurs, the other actuator is actuated to resume control with full performance maintained.

Resolver 35 or another type of position sensor is provided to sense the position of rotor 32 relative to housing 34 and stator 31. Resolver 35 is provided to commutate the position of rotor 32 based on the input command from controller 90. Resolver 55 or another type of position sensor is provided to sense the position of rotor 52 relative to housing 54 and stator 51. Resolver 55 is provided to commutate the position of rotor 52 based on the input command from controller 90. Resolver 22 or another type of position sensor is provided to sense the position of output horn 16 relative to frame 19. A position sensor may be any electrical device for measuring the position, or a derivative of position, or distance from an object, examples of which include an encoder, a resolver, a potentiometer, a hall effect sensor, a linear variable differential transformer, a variable resistor, a variable capacitor, a laser rangefinder, an ultrasonic range detector, an infrared range detector, or other similar devices.

Controller 90 receives input commands from pilot interface 95 and continuously compares resolver positions and monitors 122 for a mechanical failure. System 15 thereby includes diagnostic feedback to controller 90. Controller 90 monitors for data integrity, monitors the states of the sensor devices, monitors power supplies, and sets a fault if the subject parameters fall outside of acceptable levels. Controller 90 includes data sampling and storage mechanisms for receiving and storing sensory data and data storage for storing operational parameters as well as sensory data logs. Controller 90 is configured to perform a variety of computer-implemented functions such as performing method steps, calculations and the like and storing relevant data as disclosed herein. For communicating with various sensors, a sensor interface permits signals transmitted from the sensors to be converted into signals that can be understood and processed by processor 90. The sensors may be coupled to the sensor interface via a wired connection. In other embodiments they may be coupled to the sensor interface via a wireless connection. In this embodiment, controller 90 is a field programmable gate array ("FPGA"). However, a programmable logic device ("PLD"), microprocessor, microcontroller or other similar device may be used as alternatives. A controller may be any digital device which has output lines that are a logic function of its input lines, examples of which include a microprocessor, microcontroller, field programmable gate array, programmable logic device, application specific integrated circuit, or other similar devices. Controller 90 has inputs to receive the respective output signals from the sensors. Controller 90 is programmed to operate as described herein and shown in FIGS. 10, 11, 14, and 15.

Figure 14:
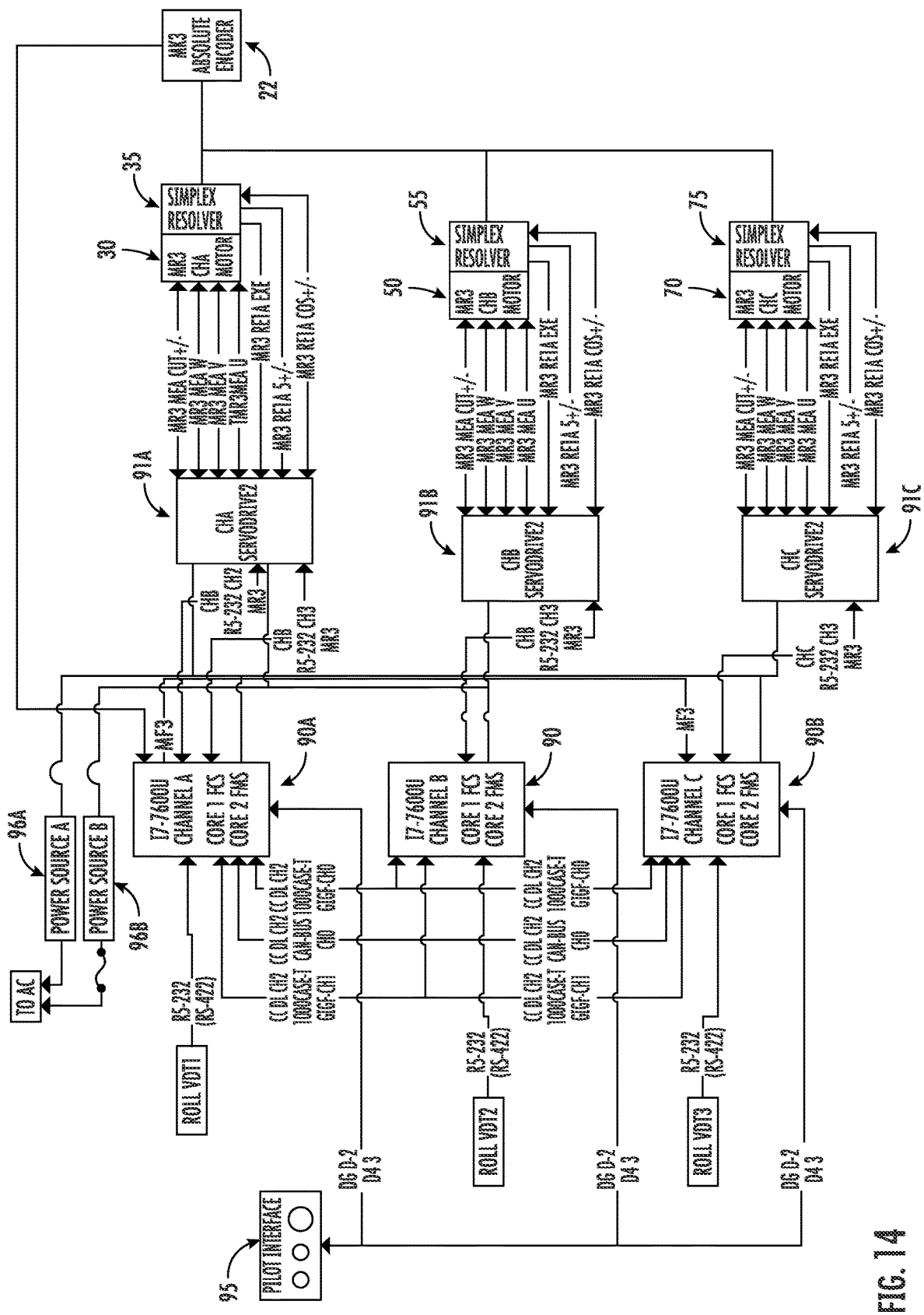
FIG. 14 is a block diagram of the controller system of the three-motor embodiment of an improved actuator system shown in FIG. 13.

In addition, as shown in FIGS. 10 and 14, a redundant processor 90A may be provided, as well as a processor 90B for modeling purposes. Redundant power sources 96A and 96B may also be employed. Motor drivers 91A and 91B include drive power output electronics to commutate motors 30 and 50, respectively, and receive feedback from sensors in the system and control motors 30 and 50 accordingly.

Figure 9:
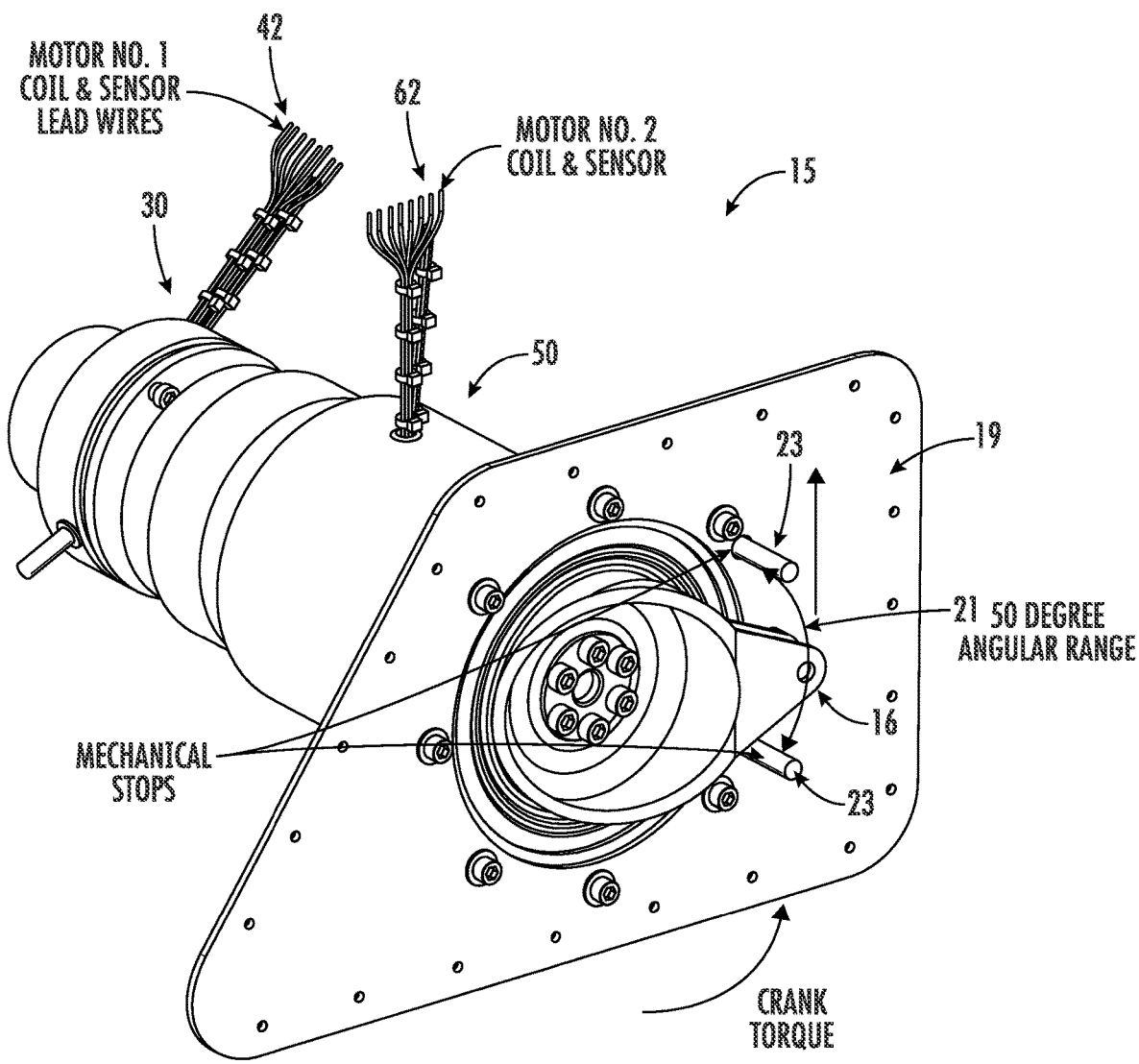
FIG. 9 is a right end perspective view of the two-motor embodiment of an improved actuator system shown in FIG. 3.

As also shown in FIGS. 2, 3 and 9, rotational stops 60 are provided to limit the angular rotational range about axis 18 of housing 54 relative to housing 34 and frame 19. In this embodiment, stops 60 provide a 120 degree angular limit or less. Rotational stops 23 are provided to limit angular rotational range 21 about axis 18 of output horn 23 relative to frame 19. In this embodiment, stops 23 provide an angular range 21 limit of 60 degrees or less. This allows for a simplified control scheme and for electrical cabling to the actuators without slip rings for signal commutation.

Thus, system 15 combines rotary actuators to provide redundant full performance fail safe operation. Traditional multiple actuator systems have employed summing linkages or gearboxes which are more complex and result in undesireable characteristics. Both summing linkages and gearboxes require higher part counts and greater size envelope and weight. Such traditional systems have undesireable characteristics following a failure of one of the actuators and offer reduced reliability and safety through the introduction of higher part count and failure modes that cannot be adequately mitigated.

FIG. 12 is a schematic view of three-motor embodiment 115. This provides triple redundancy. This embodiment is similar to system 15 described above with respect to actuators 30 and 50. However, in this embodiment, third actuator 70 is provided between rotor 52, and in particular output gear shaft 59 of gearing 58, and output horn 16. In this embodiment, output gear shaft 59 of gearing 58 of motor 50 is rigidly connected to housing 74 of motor 70. Housing 74 is rotationally supported by aircraft frame 19 such that housing 74 will rotate about axis 18 with the rotation of output shaft 59 of gearing 58, which is rotationally coupled to rotor 52 of motor 50. If rotor 52 of motor 50 is not rotating relative to housing 54 and/or no-back device 100B is in a locked position, housing 74 does not rotate relative to motor housing 54. If no-back device 100B is in an unlocked position, housing 74 will rotate about axis 18 relative to motor housing 54 with rotation of rotor 52 relative to motor housing 54 as a function of the coupling ratio between rotor 52 and output gear shaft 59 of gearing 58.

Actuator 70 is supported in housing 74 and includes stator 71 and rotor 72. Stator 71 is fixed to housing 74 and rotor 72 is driven to rotate about central axis 18 relative to housing 74 and stator 71. In this embodiment actuator 70 is a brushless DC permanent magnet electrical motor with non-powered no-back device 100C and planetary gearing unit 78. Rotary motor 70 includes outer non-rotating stator 71 with coil windings and inner rotor 72 with permanent magnets 76. Stator 71 is fixed to motor housing 74 such that stator 71 does not rotate relative to housing 74. When current is appropriately applied through the coils of stator 71, via drive unit 91C, a magnetic field is induced. The magnetic field interaction between stator 71 and rotor 72 generates torque which may rotate shaft 101C. Drive electronics 91C, based on resolver 75 angular position feedback, generate and commutate the stator fields to vary the speed and direction of motor 70. Accordingly, motor 70 will selectively apply a torque on rotor 72 in either direction about axis 18 at varying speeds. Rotor 72 is thereby driven to selectively rotate about axis of rotation 73 relative to stator 71 and housing 74.

Rotor 72 is rotationally coupled to no-back input shaft 101C of no-back device 100C. No-back device 100C is substantially the same configuration as no-back device 100A. Thus, output shaft 102C is prevented from rotating in the absence of a driving torque from motor 70 and rotor 72 on input shaft 101C by springs 105 that effectively ground output shaft 102C to housing 74 via plate 104 and lock pins 106. Upon the application of torque from rotor 72 to input shaft 101C, springs 105 are compressed and pins 106 are released from housing 74 and output shaft 102C is engaged to provide for the transmission of power from input shaft 101C to output shaft 102C.

Output shaft 102C of no-back device 100C is in turn rotationally coupled to gear transmission 78. Gear transmission 78 is substantially the same configuration as gear transmission 38. In this embodiment, the input to output ratio of gear box 78 is greater than 1 and is preferably at least 120 to 1.

Other rotary motors or actuators, such as stepper motors, brush motors, induction motors, rotary hydraulic actuators, or the like, may be used as alternatives. Also, other no-back devices, including without limitation powered no-back devices, may be used as alternatives. In addition, other gear transmissions or rotational couplings, such as a belt coupling or other similar couplings, may be used to provide a desired gear or speed ratio, or no gears may be used as alternatives.

In this embodiment 115, output gear shaft 79 of gearing 78 is in turn rigidly connected to output horn 16. Output horn 16 is rotationally supported by aircraft frame 19 such that output horn 16 will rotate about axis 18 with the rotation of output shaft 79 of gearing 78, which is rotationally coupled to rotor 72 of motor 70. If rotor 72 of motor 70 is not rotating relative to motor housing 74 and/or no-back device 100C is in a locked position, output horn 16 does not rotate relative to housing 74. If no-back device 100C is in an unlocked position, output horn 16 will rotate about axis 18 relative to housing 74 with rotation of rotor 72 relative to motor housing 74 as a function of the coupling ratio between rotor 72 and output gear shaft 79 of gearing 78.

Figure 15:
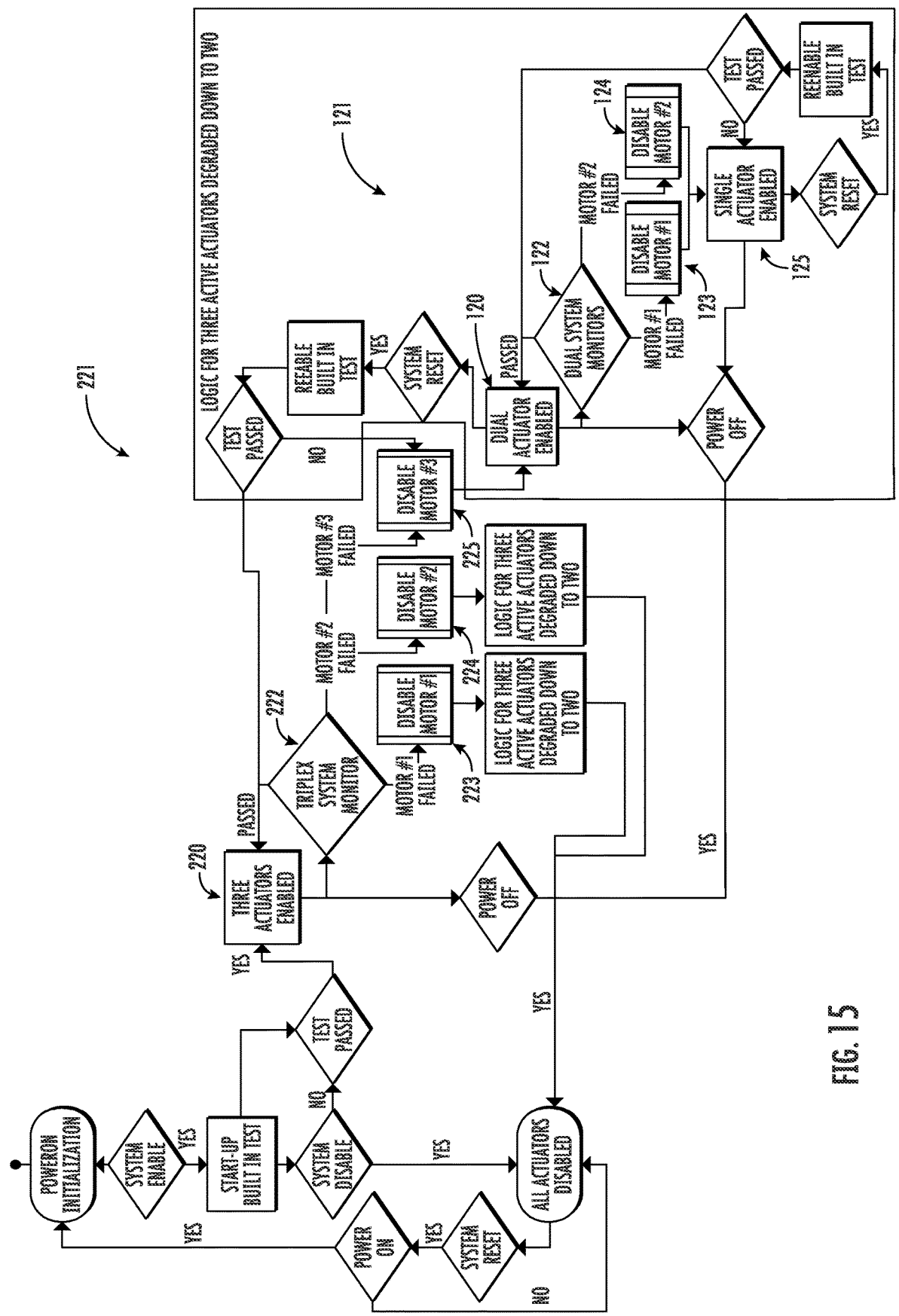
FIG. 15 is a block diagram of controller logic for the controller system shown in FIG. 14.

As shown in FIGS. 14 and 15, controller 90 is connected to motor drivers 91A, 91B and 91C and monitors 222 actuators 30, 50 and 70 and provides commands to actuators 30, 50 and 70 to move output horn 16 to a desired position by controlling the respective rotation of rotor 32 relative stator 31 and motor housing 34, the rotation of rotor 52 relative to stator 51 and motor housing 54, and the rotation of rotor 72 relative to stator 71 and motor housing 74. In a normal mode 220, actuators 30, 50 and 70 are controlled to rotate output horn 16 and, via linkage 25, move flight control output 20 as a function of the sum of the rotation of rotor 32, rotor 52 and rotor 72 relative to frame 19. However, in motor failure mode 221, any one or two of actuators 30, 50 and 70 may be controlled to rotate output horn 16 and flight control output 20 as a function of the rotation of rotors 32, 52 and 72 relative to frame 19 when the other one or two of actuators 30, 50 or 70 fails. Accordingly, actuators 30, 50 and 70 have the characteristic that they are not back-drivable following a failure of the subject actuator and the system allows for full flight control performance in the event of an actuator failure.

During normal operation 220 and in an active-active-active scheme, all of actuators 30, 50 and 70 are used to rotate output horn 16 and flight control output 20 relative to frame 19. This is the preferred operational scheme in normal operation 120. However, if actuator 70 fails and is no longer powered or is disabled 225, because of no-back mechanism 100C, output horn 16 may be rotated by actuators 30 and 50 as dual actuators 120 in dual actuator mode 121, with output shaft 102C restrained from rotation relative to stator 71 and housing 74 via no-back mechanism 100C and motor 70 thereby operating as a rigid coupling. Alternatively, if actuator 50 fails and is no longer powered or is disabled 224, because of no-back mechanism 100B, output horn 16 may be rotated by actuators 30 and 70 as dual actuators 120 in dual actuator mode 121, with output shaft 102B restrained from rotation relative to stator 51 and housing 54 via no-back mechanism 100B and motor 50 thereby operating as a rigid coupling. In yet another alternative, if actuator 30 fails and is no longer powered or is disabled 223, because of no-back mechanism 100A, output horn 16 may be rotated by actuators 50 and 70 as dual actuators 120 in dual actuator mode 121, with output shaft 102A restrained from rotation relative to stator 31 and housing 34 via no-back mechanism 100A and motor 30 thereby operating as a rigid coupling.

If one of actuators 30, 50 and 70 has failed and is no longer powered or is disabled 223, 224 or 225, and a second of actuators 30, 50 and 70 fails and is no longer powered or is disabled 123, 124, because of no-back mechanisms 100A, 100B, 100C, respectively, output horn 16 may be rotated by the remaining single actuator 30, 50 or 70 alone 125, with the failed motors thereby operating as rigid couplings.

In the active-active-active scheme and normal mode 120, controller 90 normally divides the position command equally among actuators 30, 50 and 70 to provide control. Following the failure of an actuator, controller 90 normally divides the position command equally among the remaining two actuators to provide control. Following the failure of a second actuator, the command to the remaining actuator is simply the position command. Should any actuator stop at a non-centered position, the command to the remaining actuators or actuator is biased to washout or cancel the non-centered input of the failed actuators or actuator.

Alternatively, in normal mode 120, just one of actuators 30, 50 and 70 may be used to rotate output horn 16 and flight control output 20 relative to frame 19 during normal operation and this is referred to as an active-standby-standby scheme. In this active-standby-standby scheme, a single actuator, such as actuator 30, provides full performance control until it fails and is disabled. When this occurs, the active-standby mode is employed in which just one of the two remaining actuators, such as actuator 50, provides full performance control until it fails and is disabled. When this occurs, the other actuator, such as actuator 70, is actuated to resume control with full performance maintained.

Resolver 75 is provided to sense the position of rotor 72 relative to housing 74 and stator 71. Resolver 75 is provided to commutate the position of rotor 72 based on the input command from controller 90. Controller 90 receives input commands from pilot interface 95 and continuously compares resolver positions and monitors 222 for a mechanical failure. System 115 thereby includes diagnostic feedback to controller 90. Motor drivers 91A, 91B and 91C include drive power output electronics to commutate motors 30, 50 and 70, respectively, and receive feedback from sensors in the system and control motors 30, 50 and 70 accordingly.

As also shown in FIG. 12, rotational stops 60 are provided to limit the angular rotational range about axis 18 of housing 54 relative to housing 34 and frame 19. In this embodiment, stops 60 provide a 120 degree angular limit or less. Rotational stops 80 are provided to limit the angular rotational range about axis 18 of housing 74 relative to housing 54 and frame 19. In this embodiment, stops 80 provide a 240 degree angular limit or less. Rotational stops 23 are provided to limit the angular rotational range about axis 18 of output horn 23 relative to frame 19. In this embodiment, stops 23 provide an angular range 21 limit of 60 degrees or less. This allows for a simplified control scheme and for electrical cabling to the actuators without slip rings for signal commutation. This also enables the system to provide a full range of angular motion of output horn 16 even with just one actuator operational together with full velocity.

Frame 19 includes multiple bearings to provide rotational engagement with motor housings 54 and 74 and output horn 16. In this embodiment, rotary motors 30, 50 and 70 are mounted with their drive shafts coaxial and aligned about center axis 18. No-back mechanisms 100A, 100B, 100C, gear transmissions 38, 58 and 78, and output horn 16 are also aligned about center axis 18.

As described above, actuator system 115 provides triple redundancy and fault or jam tolerance, which is critical in this and other flight applications. Systems 15 and 115 provide a redundant actuation system with continual power and output motion even after an internal mechanical failure that would in other systems cause a jam or locked output.

Several modifications can be made to the disclosed embodiments. For example and without limitation, additional actuators orientated about the same center axis and having the functionality described above may be added to the system to provide further redundancy. Also, position sensors, resolvers, and/or encoders may be added to actuators and/or any other linkages in order to provide redundancy and useful feedback to a controller. Furthermore, additional torque sensors, position sensors and/or tachometers may be added to each actuator output and/or any other link joint in linkage system 25 to provide further feedback.

Therefore, while the presently-preferred form of the actuator system has been shown and described, and several modifications discussed, persons skilled in this art will readily appreciate that various additional changes may be made without departing from the scope of the invention.

What is claimed is:

1. A rotary actuator assembly comprising:
an output member configured to selectively rotate about a rotary output axis relative to a structure and configured to impart motion to a driven object;
a first sub-actuator having a first stator and a first rotor;
said first stator fixed to said structure and said first rotor configured to selectively rotate about a first sub-axis of rotation relative to said first stator;
a second sub-actuator having a second stator and a second rotor;
said second rotor configured to selectively rotate about a second sub-axis of rotation relative to said second stator;
said second stator connected to said first rotor such that said second stator rotates about said first sub-axis of rotation relative to said first stator with rotation of said first rotor about said first sub-axis of rotation relative to said first stator;
said second rotor connected to said output member;
at least one controller configured to drive said first sub-actuator and said second sub-actuator to selectively control rotation of said output member about said rotary output axis within an output angular range of rotary motion about said rotary output axis;
said controller configured in a normal mode to drive said first sub-actuator and said second sub-actuator to selectively control said rotation of said output member about said rotary output axis within said output angular range of rotary motion as a function of a sum of rotation of said first rotor and said second rotor about the first sub-axis of rotation and said second sub-axis of rotation, respectively, relative to said structure; and said controller configured in a failure mode to drive one of said first sub-actuator or said second sub-actuator to selectively control said rotation of said output member about said rotary output axis within said output angular range of rotary motion with an operational failure of said other of said first sub-actuator or said second sub-actuator.

2. The rotary actuator assembly as set forth in claim 1, comprising:

a third sub-actuator having a third stator and a third rotor;

said third rotor configured to selectively rotate about a third sub-axis of rotation relative to said third stator;

said third stator connected to said second rotor such that said third stator rotates about said second sub-axis of rotation relative to said second stator with rotation of said second rotor about said second sub-axis of rotation relative to said second stator;

said third rotor connected to said output member between said second rotor and said output member;

said controller configured in said normal mode to drive said first sub-actuator, said second sub-actuator, and said third sub-actuator to selectively control said rotation of said output member about said rotary output axis within said output angular range of rotary motion as a function of a sum of rotation of said first rotor, said second rotor, and said third rotor about the first sub-axis of rotation, said second sub-axis of rotation, and said third sub-axis of rotation, respectively, relative to said structure; and said controller configured in said failure mode to drive at least one of said first sub-actuator, said second sub-actuator, or said third sub-actuator to selectively control said rotation of said output member about said rotary output axis within said output angular range of rotary motion with an operational failure of said other of said first sub-actuator, said second sub-actuator, or said third sub-actuator.

3. The rotary actuator assembly as set forth in claim 1, wherein said first sub-axis of rotation and said second sub-axis of rotation are the same and said first rotor and said second rotor are coaxial.

4. The rotary actuator assembly as set forth in claim 2, wherein said first sub-axis of rotation, said second sub-axis of rotation, and said third sub-axis of rotation are the same and said first rotor, said second rotor, and said third rotor are coaxial.

5. The rotary actuator assembly as set forth in claim 1, wherein said first sub-axis of rotation, said second sub-axis of rotation, and said rotary output axis are the same.

6. The rotary actuator assembly as set forth in claim 1, wherein:

said first sub-actuator comprises a no-back brake configured to selectively restrain said first rotor from rotating about said first sub-axis of rotation relative to said first stator in a back-driven rotational direction with an operational failure of said first sub-actuator; and said second sub-actuator comprises a no-back brake configured to selectively restrain said second rotor from rotating about said second sub-axis of rotation relative to said second stator in a back-driven rotational direction with an operational failure of said second sub-actuator.

7. The rotary actuator assembly as set forth in claim 6, wherein said controller is configured to sense an operational failure of said first sub-actuator and to cease driving said first sub-actuator in response, and said controller is configured to sense an operational failure of said second sub-actuator and to cease driving said second sub-actuator in response.

8. The rotary actuator assembly as set forth in claim 1, wherein:

first sub-actuator comprises a first position sensor connected to said controller and configured to sense an angular position of said first rotor about said first sub-axis of rotation relative to said first stator; and said second sub-actuator comprises a second position sensor connected to said controller and configured to sense an angular position of said second rotor about said second sub-axis of rotation relative to said second stator.

9. The rotary actuator assembly as set forth in claim 8, wherein said output member comprises an output position sensor connected to said controller and configured to sense an angular position of said output member about said rotary output axis relative to said structure.

10. The rotary actuator assembly as set forth in claim 1, comprising a first gearing between said first rotor and said second stator, and a second gearing between said second rotor and said output member.

11. The rotary actuator assembly as set forth in claim 10, wherein said first gearing and said second gearing each comprise an input to output ratio of greater than one.

12. The rotary actuator assembly as set forth in claim 10, wherein said first gearing and said second gearing each comprise a planetary gear.

13. The rotary actuator assembly as set forth in claim 1, comprising gearing between said first rotor and said second stator and said first rotor comprises an input to said gearing and said second stator comprises an output from said gearing.

14. The rotary actuator assembly as set forth in claim 1, wherein said second stator rotates about said first sub-axis of rotation relative to said first stator with rotation of said first rotor about said first sub-axis of rotation relative to said first stator at a rate of rotation that differs from a rate of rotation of said first rotor about said first sub-axis of rotation relative to said first stator.

15. The rotary actuator assembly as set forth in claim 14, wherein said rate of rotation of said second stator about said first sub-axis of rotation relative to said first stator differs from said rate of rotation of said first rotor about said first sub-axis of rotation relative to said first stator as a function of a coupling ratio between said second stator and said first rotor.

16. The rotary actuator assembly as set forth in claim 1, wherein said output angular range of rotary motion is less than 360 degrees about said rotary output axis.

17. The rotary actuator assembly as set forth in claim 1, comprising a first mechanical stop limiting rotation of said second stator about said first sub-axis of rotation relative to said first stator to a second stator angular limit of less than or equal to 360 degrees.

18. The rotary actuator assembly as set forth in claim 17, wherein said second stator angular limit of said first mechanical stop is at least twice said output angular range of rotary motion of said output member about said rotary output axis.

19. The rotary actuator assembly as set forth in claim 18, comprising a mechanical stop limiting said output member to said output angular range of rotary motion of said output member about said rotary output axis.

20. The rotary actuator assembly as set forth in claim 2, comprising:
- a first mechanical stop limiting rotation of said second stator about said first sub-axis of rotation relative to said first stator to a second stator angular limit of less than 360 degrees; and
- a second mechanical stop limiting rotation of said third stator about said second sub-axis of rotation relative to said first stator to a third stator angular limit of less than 360 degrees.

21. The rotary actuator assembly as set forth in claim 20, wherein:
- said second stator angular limit of said first mechanical stop is at least twice said output angular range of rotary motion of said output member about said rotary output axis; and
- said third stator angular limit of said second mechanical stop is at least twice said second stator angular limit of said first mechanical stop.

22. The rotary actuator assembly as set forth in claim 21, comprising a mechanical stop limiting said output member to said output angular range of rotary motion of said output member about said rotary output axis.

23. The rotary actuator assembly as set forth in claim 1, wherein said first sub-actuator comprises a brushless DC permanent magnet motor configured to drive said first rotor about said first sub-axis of rotation relative to said first stator, and said second sub-actuator comprises a brushless DC permanent magnet motor configured to drive said second rotor about said second sub-axis of rotation relative to said second stator.

24. The rotary actuator assembly as set forth in claim 1, wherein said driven object is selected from a group consisting of an aircraft flight control mechanism and an aircraft flight control surface.

25. The rotary actuator assembly as set forth in claim 24, wherein said driven object comprises said aircraft flight control surface and said aircraft flight control surface is selected from a group consisting of an elevator, a rudder, an aileron, a flap, a slat, a stabilizer, and a spoiler.

26. The rotary actuator assembly as set forth in claim 24, wherein said driven object comprises said aircraft flight control surface and said output member is connected to said flight control surface via a torque tube.

27. The rotary actuator assembly as set forth in claim 24, wherein said driven object comprises said aircraft flight control mechanism and said aircraft flight control mechanism is selected from a group consisting of a helicopter main rotor blade, a helicopter tail rotor blade, a helicopter main rotor swashplate, and a helicopter tail rotor swashplate.

28. The rotary actuator assembly as set forth in claim 1, wherein said operational failure comprises a mechanical jam, an electrical motor failure or a loss of power.

* * * * *